Oct. 29, 1935.                F. P. BOWERS                 2,019,068
                         RESILIENT VEHICLE WHEEL
                         Filed July 30, 1934          3 Sheets-Sheet 1
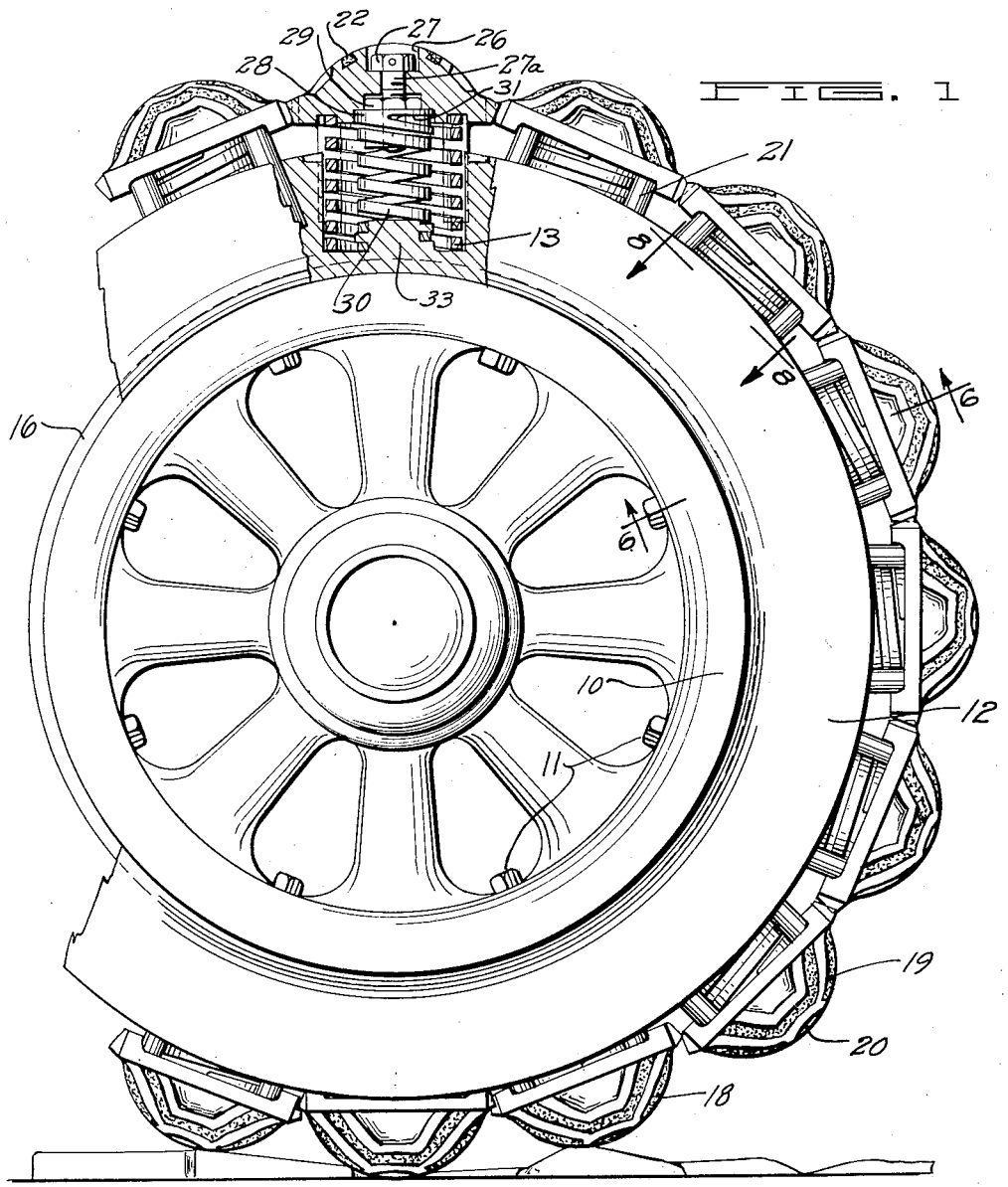
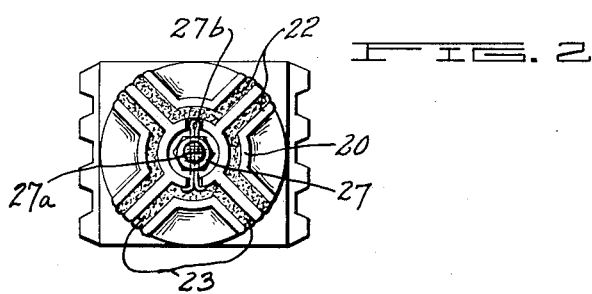
INVENTOR.
Frank P. Bowers
BY John A. Bommhardt
                    ATTORNEY.

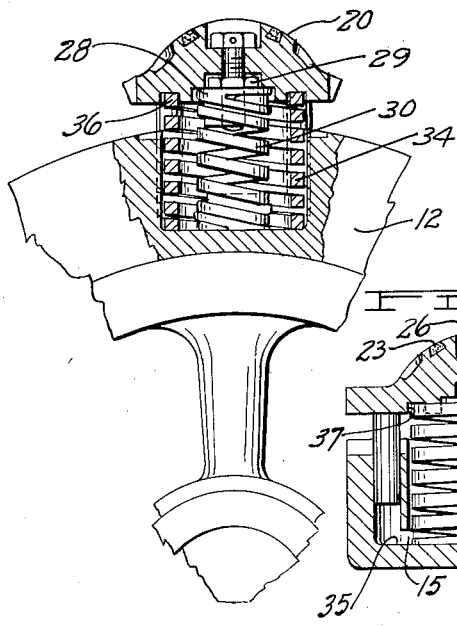
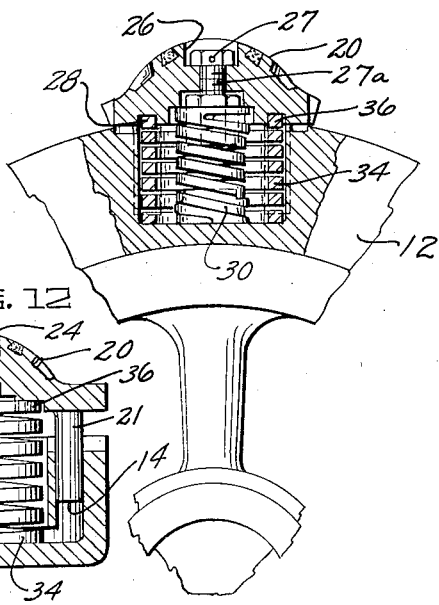
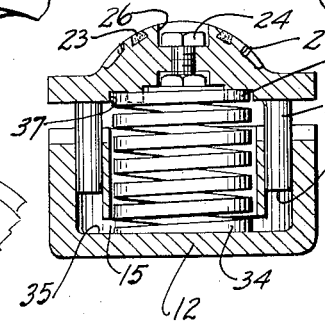
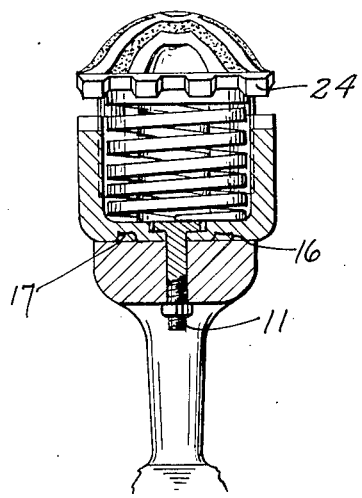
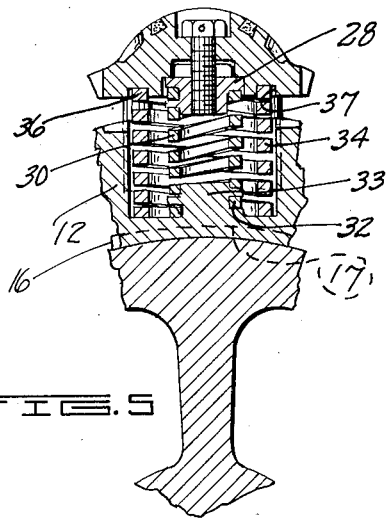

Oct. 29, 1935.   F. P. BOWERS   2,019,068
RESILIENT VEHICLE WHEEL
Filed July 30, 1934   3 Sheets-Sheet 3
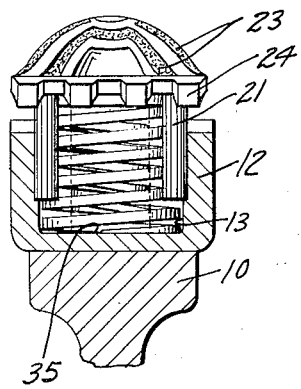
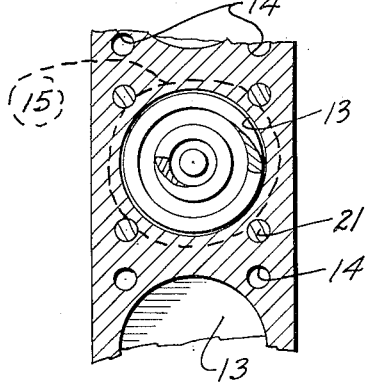
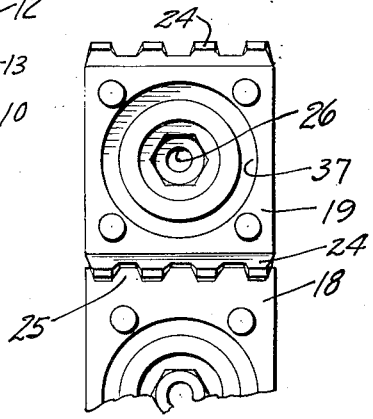
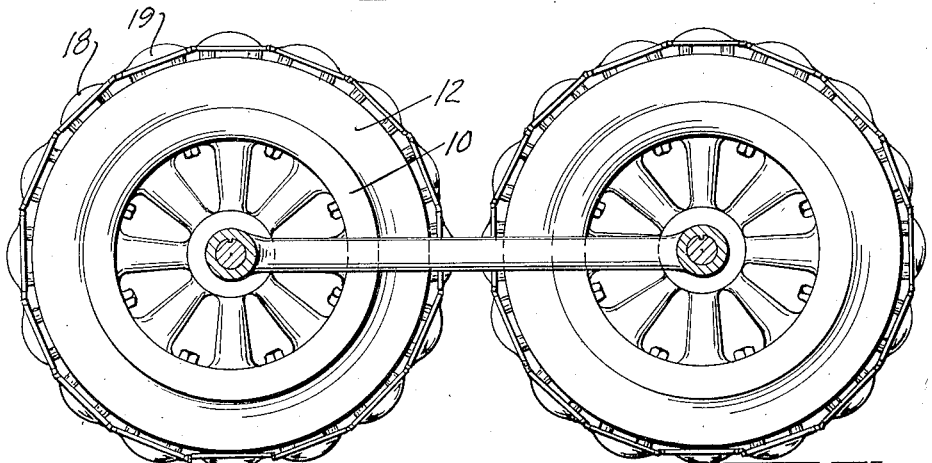
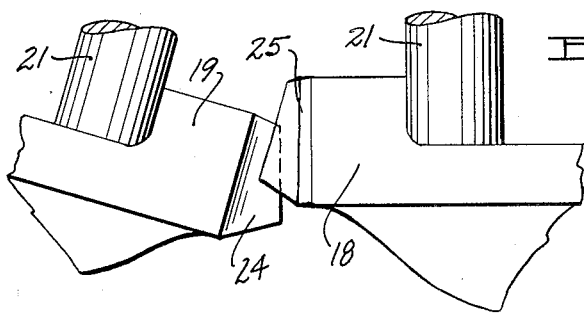
INVENTOR.
Frank P. Bowers
BY
ATTORNEY.

UNITED STATES PATENT OFFICE 2,019,068

RESILIENT VEHICLE WHEEL

Frank P. Bowers, Cleveland, Ohio

Application July 30, 1934, Serial No. 737,548

2 Claims. (Cl. 152—8)

This invention relates to improvements in resilient vehicle wheels and more particularly to a vehicle wheel comprising a resilient tread.

One object of the invention is to provide a resilient tread for a vehicle wheel made up of a plurality of tread sections or units, the outer contour of the tread sections being designed in a different radius from that of the wheel, which causes the tread to make a better contact and thus a better traction on the surface over which it travels. The outer contour of the tread sections or cap also has a tendency to make the springs, which resiliently supports the treads, to work in a straight line instead of side-ways which is of great advantage and lengthens the life of the springs.

Another object of the invention is to inter-engage the respective tread sections in such a manner as to make them self-cleaning and also giving the treads more lateral strength and equalizing the load from one tread section to the other.

Other objects and advantages will be apparent from the following specification and the accompanying drawings in which:

Fig. 1 is a side elevation partly in section, of a wheel equipped with the resilient tread in which this invention is embodied.

Fig. 2 is a top plan view of a tread unit.

Fig. 3 is a side elevation partly in section of a portion of a wheel and tread unit in normal position in relation to the associated mechanism.

Fig. 4 is a view similar to Fig. 3 but showing the tread unit depressed.

Fig. 5 is a section similar to Fig. 3 showing the holding means for the compression spring.

Fig. 6 is a section partly in elevation taken on lines 6—6 of Fig. 1.

Fig. 7 is a section similar to Fig. 6 except that the tread unit is shown in elevation.

Fig. 8 is a section taken on lines 8—8 of Fig. 1.

Fig. 9 is a view of the under face of the tread units inter-engaged.

Fig. 10 is a diagrammatic view of a method for mounting a pair of wheels in tandem.

Fig. 11 is an enlarged fragment showing the interengaging means.

Fig. 12 shows a section taken through the whole tire assembly.

Referring more particularly to the drawings in which similar characters indicate like parts: a wheel rim 10 has attached thereto as by bolts 11 a ring 12, said ring having a series of cylindrical recesses 13 therein radially aligned around the outer circumference of the said ring as best shown in Fig. 8. A series of apertures 14 are spaced around the cylindrical recesses 13 said apertures 14 communicating with the cylindrical recesses 13 as by means of a passage 15, as best shown in Figs. 8 and 12, for a purpose to be later explained.

As shown in Figs. 1, 5, and 6 the wheel rim 10 has mounted on its outer circumference a pair of circumferential ribs 16 which may be inserted in grooves 17 in the inner surface of the ring 12 to more securely unite the ring with the wheel. In such a modification the ring 12 may be formed in sections to facilitate the assembly on the wheel rim 10. However, such a construction is not absolutely necessary and the ribs and grooves can be eliminated as shown in the other figures, this form being more universally used.

A series of metallic tread units, two of which are described and shown at 18 and 19 extend around the entire outer circumference of the ring 12. The rounded outer surface 20 of the tread units is grooved as at 22 in a manner similar to that shown in the illustrations, said grooves being filled preferably with a resilient material 23, such as vulcanized rubber, to deaden the sound of the metal treads as they strike the road or other surface over which the treads pass. The tread units are mounted above the recesses 13 and the legs 21 rigidly secured to the under side of the tread units 18 and 19 are slidably mounted and work within the apertures 14 spaced around the said cylindrical recesses. Each tread unit has four legs 21 placed at its four corners.

Each tread unit 18 alternates with tread unit 19, being male and female respectively, each tread having corresponding teeth 24 or 25 at each side to form an inter-engaging means between the treads as shown in Figs. 1, 9, and 11.

An aperture 26 in the center of the outer face 20 retains a lock nut 27 secured on bolt 27a by a cotter 27b, said bolt 27a projecting upward through a retaining block 28, and hexagon boss 29 on said retaining block 28 and through tread unit 18 or 19. The top coil of a compression spring 30 is inserted in the split side 31 of the retaining block 28 and coiled around the block thus gripping the spring 30 to prevent slipping. The lower or bottom coil 32 of compression spring 30 is placed in a similar position on a retaining boss 33, in the center of the cylinder 13, that is an integral part of the ring 12.

An expansion spring 34 that is larger in circumference than the compression spring 30, seats on the cylinder floor 35, the top coil 36 fitting within a recess 37 in the under surface of the tread units 18 and 19.

In operation as the wheel turns on the road, each tread unit 18 or 19, as it contacts the ground surface, moves inward in turn and as the wheel revolves out of contact, with the ground the tread moves outward again to the normal position.

The interlocking tread teeth move in and out as shown in Figure 11, the two springs 30 and 34 automatically equalize the load and balance one another, the spring 30 has a tendency to draw the tread 18 or 19 in while the spring 34 resists this inward movement. The legs 21 of the tread units 18 and 19 move up and down within the apertures 14, thus as dirt particles, small sticks or stones are drawn in between the interlocking teeth of the tread units, they are ejected again by the up and down movement of the legs 21, however, should any dirt particles drop down within the apertures 14, they will drop through the passage 15 and into the cylinder and be expelled through the spring action as the wheel revolves.

I claim:

1. The combination of a wheel rim, a ring mounted thereon having a series of radial recesses in its circumference and apertures beside said recesses, and spring-supported tread units mounted opposite said recesses, and legs depending from the tread units, and working in the apertures, said apertures being connected at their lower ends to the respective recesses by a circular passage.

2. The combination of a wheel rim, a ring mounted thereon having a series of radial recesses in its circumference and apertures beside said recesses, and spring-supported tread units mounted opposite said recesses, and legs depending from the tread units, and working in the apertures, said apertures being connected at their lower ends to the respective recesses by a circular passage, the outer surface of the said units being struck on a different radius from that of the wheel rim, thus giving a contour to the treads different from that of the wheel rim.

FRANK P. BOWERS